United States Patent
Hergesheimer et al.

(10) Patent No.: US 10,107,831 B2
(45) Date of Patent: Oct. 23, 2018

(54) SYSTEMS AND METHODS FOR EFFICIENT CHARACTERIZATION OF ACCELERATION EVENTS

(71) Applicant: CALAMP CORP., Oxnard, CA (US)

(72) Inventors: Peter Hergesheimer, Encinitas, CA (US); Alexandre Dlagnekov, Escondido, CA (US)

(73) Assignee: CALAMP CORP, Irvine, CA (US)

( * ) Notice: Subject to any disclaimer, the term of this patent is extended or adjusted under 35 U.S.C. 154(b) by 701 days.

(21) Appl. No.: 13/683,446

(22) Filed: Nov. 21, 2012

(65) Prior Publication Data

US 2014/0142886 A1     May 22, 2014

(51) Int. Cl.
    *G01P 15/18*      (2013.01)
    *G01P 15/08*      (2006.01)
    *G01P 1/12*      (2006.01)

(52) U.S. Cl.
    CPC .......... *G01P 15/18* (2013.01); *G01P 15/0891* (2013.01); *G01P 1/127* (2013.01)

(58) Field of Classification Search
    CPC ....... G01P 15/18; G01P 15/0891; G01P 1/127
    See application file for complete search history.

(56) References Cited

U.S. PATENT DOCUMENTS

| | | | |
|---|---|---|---|
| 4,497,025 A | 1/1985 | Hannoyer | |
| 4,549,277 A | 10/1985 | Brunson et al. | |
| 5,058,020 A | 10/1991 | Matsuda | |
| 5,117,375 A | 5/1992 | Worcester et al. | |
| 5,251,161 A | 10/1993 | Gioutsos et al. | |
| 5,253,173 A | 10/1993 | Drobny et al. | |
| 5,337,238 A | 8/1994 | Gioutsos et al. | |

(Continued)

FOREIGN PATENT DOCUMENTS

| | | |
|---|---|---|
| EP | 2056298 A1 | 5/2009 |
| EP | 2083276 A1 | 7/2009 |

(Continued)

OTHER PUBLICATIONS

Memsic 2125 Dual-Axis Accelerometer (#28017) Data Sheet (Parallax Inc., v2.0 Jan. 29, 2009).*

(Continued)

*Primary Examiner* — Paul D Lee
*Assistant Examiner* — Mark Crohn (57) ABSTRACT

Systems and methods for the efficient characterization of acceleration events in accordance embodiments of the invention are disclosed. In one embodiment of the invention, an acceleration characterization telematics system includes an acceleration sensor, a storage device, where the storage device is configured to store an acceleration event characterization application, and a processor, wherein the acceleration event characterization application configures the processor to receive acceleration information using the acceleration sensor, determine short interval filter information using the received acceleration information, determine long interval filter information using the received acceleration information, and characterize an acceleration event in the received acceleration information using the received acceleration information, the short interval filter information, and the long interval filter information.

18 Claims, 5 Drawing Sheets

(56) References Cited

U.S. PATENT DOCUMENTS

| | | |
|---|---|---|
| 5,339,242 A | 8/1994 | Jensen et al. |
| 5,519,613 A | 5/1996 | Gioutsos et al. |
| 5,559,699 A | 9/1996 | Gioutsos et al. |
| 5,563,791 A | 10/1996 | Gioutsos et al. |
| 5,587,906 A | 12/1996 | Muckley et al. |
| 5,684,701 A | 11/1997 | Breed et al. |
| 5,754,115 A | 5/1998 | Woo |
| 5,758,301 A | 5/1998 | Saito et al. |
| 5,780,782 A | 7/1998 | O'Dea et al. |
| 5,805,460 A * | 9/1998 | Greene et al. .............. 702/79 |
| 5,825,283 A | 10/1998 | Camhi |
| 5,841,201 A | 11/1998 | Ibaraki et al. |
| 5,862,511 A | 1/1999 | Croyle et al. |
| 6,029,111 A | 2/2000 | Croyle |
| 6,076,028 A | 6/2000 | Donnelly et al. |
| 6,085,151 A | 7/2000 | Farmer et al. |
| 6,163,690 A | 12/2000 | Lilja |
| 6,236,921 B1 | 5/2001 | McConnell |
| 6,269,290 B1 | 7/2001 | Tsuji et al. |
| 6,308,134 B1 | 10/2001 | Croyle et al. |
| 6,346,876 B1 | 2/2002 | Flick |
| 6,356,841 B1 | 3/2002 | Hamrick et al. |
| 6,363,308 B1 | 3/2002 | Potti et al. |
| 6,401,027 B1 | 6/2002 | Xu et al. |
| 6,417,802 B1 | 7/2002 | Diesel |
| 6,431,593 B1 | 8/2002 | Cooper et al. |
| 6,438,475 B1 | 8/2002 | Gioutsos et al. |
| 6,532,419 B1 | 3/2003 | Begin |
| 6,540,255 B1 | 4/2003 | Garcia et al. |
| 6,611,755 B1 | 8/2003 | Coffee et al. |
| 6,737,989 B2 | 5/2004 | Flick |
| 6,756,885 B1 | 6/2004 | Flick |
| 6,812,888 B2 | 11/2004 | Drury et al. |
| 6,832,140 B2 | 12/2004 | Fan et al. |
| 7,015,830 B2 | 3/2006 | Flick |
| 7,020,501 B1 | 3/2006 | Elliott et al. |
| 7,085,637 B2 | 8/2006 | Breed et al. |
| 7,110,880 B2 | 9/2006 | Breed et al. |
| 7,250,850 B2 | 7/2007 | Mizutani |
| 7,272,493 B1 | 9/2007 | Hamrick et al. |
| 7,286,929 B2 | 10/2007 | Staton et al. |
| 7,348,895 B2 | 3/2008 | Lagassey et al. |
| 7,366,608 B2 | 4/2008 | Hamrick et al. |
| 7,460,954 B2 | 12/2008 | Hamrick et al. |
| 7,484,756 B2 | 2/2009 | Chou et al. |
| 7,527,288 B2 | 5/2009 | Breed et al. |
| 7,577,525 B2 | 8/2009 | Hamrick et al. |
| 7,643,919 B2 | 1/2010 | Nicaise |
| 7,671,727 B2 | 3/2010 | Flick |
| 7,725,218 B2 | 5/2010 | Hamrick et al. |
| 7,765,039 B1 | 7/2010 | Hagenbuch |
| 7,805,231 B2 | 9/2010 | Cluff et al. |
| 8,004,397 B2 | 8/2011 | Forrest et al. |
| 8,010,251 B2 | 8/2011 | Hamrick et al. |
| 8,032,278 B2 | 10/2011 | Flick |
| 8,489,271 B2 | 7/2013 | Hergesheimer et al. |
| 8,688,380 B2 | 4/2014 | Cawse et al. |
| 8,762,009 B2 | 6/2014 | Ehrman et al. |
| 8,812,173 B2 | 8/2014 | Chen et al. |
| 9,002,538 B2 | 4/2015 | Hergesheimer et al. |
| 9,179,497 B1 | 11/2015 | Teixeira et al. |
| 9,217,757 B2 | 12/2015 | Hergesheimer et al. |
| 9,406,222 B2 | 8/2016 | Hergesheimer et al. |
| 9,459,277 B2 | 10/2016 | Hergesheimer et al. |
| 9,644,977 B2 | 5/2017 | Camisa |
| 2002/0100310 A1 | 8/2002 | Begin |
| 2002/0135167 A1 | 9/2002 | Mattes et al. |
| 2003/0001368 A1 | 1/2003 | Breed et al. |
| 2003/0151507 A1 | 8/2003 | Andre et al. |
| 2003/0176959 A1 | 9/2003 | Breed et al. |
| 2004/0036261 A1 | 2/2004 | Breed et al. |
| 2004/0075539 A1 | 4/2004 | Savoie et al. |
| 2004/0155790 A1 | 8/2004 | Tsuji et al. |
| 2004/0257208 A1 | 12/2004 | Huang et al. |
| 2005/0065711 A1 | 3/2005 | Dahlgren et al. |
| 2005/0099289 A1 | 5/2005 | Arita et al. |
| 2006/0022469 A1 | 2/2006 | Syed et al. |
| 2006/0041336 A1 | 2/2006 | Schubert et al. |
| 2006/0047459 A1 * | 3/2006 | Underbrink et al. ......... 702/117 |
| 2006/0050953 A1 | 3/2006 | Farmer et al. |
| 2007/0027612 A1 | 2/2007 | Barfoot et al. |
| 2007/0109117 A1 | 5/2007 | Heitzmann et al. |
| 2007/0257791 A1 | 11/2007 | Arita et al. |
| 2007/0266078 A1 | 11/2007 | Rittle et al. |
| 2007/0271014 A1 | 11/2007 | Breed |
| 2007/0299587 A1 | 12/2007 | Breed et al. |
| 2008/0111666 A1 | 5/2008 | Plante et al. |
| 2008/0114545 A1 | 5/2008 | Takaoka et al. |
| 2008/0150707 A1 | 6/2008 | Shamoto |
| 2008/0195261 A1 | 8/2008 | Breed |
| 2008/0202199 A1 | 8/2008 | Finley et al. |
| 2008/0211666 A1 | 9/2008 | Saidi et al. |
| 2008/0211914 A1 | 9/2008 | Herrera et al. |
| 2008/0275601 A1 | 11/2008 | Saito et al. |
| 2008/0281618 A1 | 11/2008 | Mermet et al. |
| 2009/0217733 A1 | 9/2009 | Stachow |
| 2010/0039216 A1 | 2/2010 | Knight et al. |
| 2010/0039247 A1 | 2/2010 | Ziegler et al. |
| 2010/0039318 A1 | 2/2010 | Kmiecik et al. |
| 2010/0097316 A1 | 4/2010 | Shaw et al. |
| 2010/0185524 A1 | 7/2010 | Watkins |
| 2010/0279647 A1 | 11/2010 | Jacobs et al. |
| 2010/0312473 A1 | 12/2010 | Hoshizaki |
| 2010/0318257 A1 | 12/2010 | Kalinadhabhotla |
| 2011/0060496 A1 | 3/2011 | Nielsen et al. |
| 2011/0106373 A1 | 5/2011 | Hergesheimer et al. |
| 2011/0109438 A1 | 5/2011 | Dijkstra et al. |
| 2011/0153367 A1 | 6/2011 | Amigo |
| 2011/0202225 A1 * | 8/2011 | Willis et al. ............... 701/29 |
| 2011/0202305 A1 | 8/2011 | Willis et al. |
| 2011/0264393 A1 | 10/2011 | An |
| 2011/0320088 A1 | 12/2011 | Eom et al. |
| 2012/0022780 A1 | 1/2012 | Kulik et al. |
| 2012/0035881 A1 * | 2/2012 | Rubin et al. ............... 702/141 |
| 2012/0050095 A1 | 3/2012 | Scherzinger |
| 2012/0158211 A1 | 6/2012 | Chen et al. |
| 2012/0253585 A1 | 10/2012 | Harvie |
| 2012/0253892 A1 * | 10/2012 | Davidson .................... 705/7.42 |
| 2012/0259526 A1 | 10/2012 | Inoue |
| 2012/0303203 A1 | 11/2012 | Olsen et al. |
| 2013/0002415 A1 | 1/2013 | Walli |
| 2013/0024202 A1 | 1/2013 | Harris |
| 2013/0038439 A1 | 2/2013 | Saito et al. |
| 2013/0073142 A1 | 3/2013 | Hergesheimer et al. |
| 2013/0275001 A1 | 10/2013 | Hergesheimer et al. |
| 2013/0297137 A1 | 11/2013 | Fushiki et al. |
| 2014/0074353 A1 | 3/2014 | Lee et al. |
| 2014/0111354 A1 | 4/2014 | Hergesheimer et al. |
| 2014/0149145 A1 | 5/2014 | Peng |
| 2014/0180529 A1 | 6/2014 | Simon et al. |
| 2014/0236518 A1 | 8/2014 | Hergesheimer et al. |
| 2014/0236519 A1 | 8/2014 | Hergesheimer et al. |
| 2014/0358394 A1 | 12/2014 | Picciotti |
| 2015/0015385 A1 | 1/2015 | Tomita et al. |
| 2015/0051796 A1 | 2/2015 | Levy |
| 2015/0339241 A1 | 11/2015 | Warner et al. |
| 2016/0335813 A1 | 11/2016 | Hergesheimer et al. |
| 2016/0341559 A1 | 11/2016 | Camisa |
| 2017/0023610 A1 | 1/2017 | Hergesheimer et al. |
| 2017/0236339 A1 | 8/2017 | Camisa |
| 2018/0164401 A1 | 6/2018 | Hergesheimer |

FOREIGN PATENT DOCUMENTS

| | | |
|---|---|---|
| EP | 2923277 B1 | 9/2017 |
| JP | 2007178295 A | 7/2007 |
| WO | 2000017607 | 3/2000 |
| WO | 2002018873 | 3/2002 |
| WO | 2014081485 | 5/2014 |
| WO | 2014130077 A1 | 8/2014 |
| WO | 2014130078 A1 | 8/2014 |

(56) References Cited

FOREIGN PATENT DOCUMENTS

WO 2015183677 A1 12/2015
WO 2016191306 12/2016

OTHER PUBLICATIONS

Extended European Search Report for European Application No. 17160719.5, Search completed Apr. 6, 2017, dated Apr. 18, 2017, 6 Pgs.
Extended European Search Report for European Application No. 13875407.2, Search completed Nov. 22, 2016, dated Nov. 30, 2016, 7 Pgs.
International Preliminary Report on Patentability for International Application PCT/US2013/054939, Issued Aug. 25, 2015, dated Sep. 3, 2015, 4 Pgs.
International Preliminary Report on Patentability for International Application PCT/US2013/054943, Issued Aug. 25, 2015, dated Sep. 3, 2015, 6 Pgs.
International Search Report and Written Opinion for International Application No. PCT/US13/54939, Completed Feb. 5, 2014, dated Feb. 24, 2014, 5 pgs.
International Search Report and Written Opinion for International Application No. PCT/US13/54943, Completed Feb. 13, 2014, dated Feb. 27, 2014, 6 pgs.
International Search Report and Written Opinion for International Application No. PCT/US2016/033621, completed Jul. 28, 2016, dated Aug. 5, 2016, 11 Pgs.
"Road vehicles—Diagnostic Systems—Part 2: CARB requirements for interchange of digital information", ISO 9141-2, Feb. 1, 1994, 18 pgs.
"Surface Vehicle Recommended Practice, E/E Diagnostic Test Modes", Dec. 1991, 32 pgs.
"Surface Vehicle Recommended Practice, Universal Interface for OBD II Scan", Jun. 30, 1993, 45 pgs., SAE Standard J2201.
"Surface Vehicle Recommended Practice; OBD II Scan Tool", Mar. 1992, 14 pgs.
International Preliminary Report on Patenbtaility for International Application PCT/US2013/054956, Report Issued May 26 2015, dated Jun. 4, 2015, 9 Pgs.
International Search Report and Written Opinion for International Application No. PCT/US2013/054956, International Filing Date Aug. 14, 2013, Search Completed Feb. 11, 2014, dated Mar. 6, 2014, 9 pgs.

* cited by examiner

SYSTEMS AND METHODS FOR EFFICIENT CHARACTERIZATION OF ACCELERATION EVENTS

FIELD OF THE INVENTION

The present invention is generally related to measuring acceleration events and more specifically to efficiently analyzing and characterizing measured acceleration events.

BACKGROUND OF THE INVENTION

A Global Positioning System (GPS) is a space based global navigation satellite system that utilizes a network of geo-synchronous satellites which may be utilized by a GPS receiver to determine its location. Many telematics systems incorporate a Global Positioning System (GPS) receiver, which can be used to obtain the location of a vehicle at a certain measured time. By comparing the location of a vehicle at a plurality of measured times, the speed of the vehicle may be determined. GPS receivers can also determine speed by measuring the Doppler shift in the received satellite signals. The acceleration of the vehicle may be determined as the change in speed divided by the time between the measurements. A GPS receiver's ability to determine acceleration can be limited due to the dependence of the measurement upon factors such as reception and satellite availability. In addition to location information, a GPS receiver may also be configured to provide time data.

An accelerometer is a device that measures acceleration associated with the weight experienced by a test mass in the frame of reference of the accelerometer device. The acceleration measured by an accelerometer is typically a weight per unit of test mass, or g-force.

SUMMARY OF THE INVENTION

Systems and methods for the efficient characterization of acceleration events in accordance embodiments of the invention are disclosed. In one embodiment of the invention, an acceleration characterization telematics system includes an acceleration sensor, a storage device, where the storage device is configured to store an acceleration event characterization application, and a processor, wherein the acceleration event characterization application configures the processor to receive acceleration information using the acceleration sensor, determine short interval filter information using the received acceleration information, determine long interval filter information using the received acceleration information, and characterize an acceleration event in the received acceleration information using the received acceleration information, the short interval filter information, and the long interval filter information.

In an additional embodiment of the invention, the acceleration event characterization application further configures the processor to apply at least one threshold value to the short interval filter information.

In another embodiment of the invention, the received acceleration information includes a time interval and at least one threshold value is determined using the time interval.

In yet another additional embodiment of the invention, at least one threshold value is pre-determined.

In still another additional embodiment of the invention, the acceleration event characterization application further configures the processor to apply at least one threshold value to the long interval filter information.

In yet still another additional embodiment of the invention, the received acceleration event is a signal including a first leading edge, a first trailing edge, and a first amplitude, the short interval filter information is a signal including a second leading edge, a second trailing edge, and a second amplitude, the long interval filter information is a signal including a third leading edge, a third trailing edge, and a third amplitude, and the acceleration event characterization application further configures the processor to characterize an acceleration event in the received acceleration information using the first leading edge, the second leading edge, the third leading edge, the first trailing edge, the second trailing edge, the third trailing edge, the first amplitude, the second amplitude, and the third amplitude.

In yet another embodiment of the invention, the acceleration event characterization application further configures the processor to determine a first cross point using the first leading edge, the second leading edge, and the third leading edge, determine a second cross point using the first trailing edge, the second trailing edge, and the third trailing edge, and characterize an acceleration event using the first cross point and the second cross point.

In still another embodiment of the invention, the acceleration event characterization application further configures the processor to determine a time interval using the first cross point and the second cross point.

In yet still another embodiment of the invention, the acceleration sensor is selected from the group consisting of a 3-axis accelerometer and a global positioning receiver.

In yet another additional embodiment of the invention, the received acceleration information includes a plurality of acceleration samples and the acceleration event characterization application further configures the processor to determine short interval filter information using the received acceleration information and a short moving average filter, where the short moving average filter utilizes a first number of acceleration samples and determine long interval filter information using the received acceleration information and a long moving average filter, where the long moving average filter utilizes a second number of acceleration samples, where the second number of acceleration samples is greater than the first number of acceleration samples.

Still another embodiment of the invention includes a method for characterizing acceleration events, including receiving acceleration information using an acceleration characterization telematics system, determining short interval filter information using the received acceleration information and the acceleration characterization telematics system, determining long interval filter information using the received acceleration information and the acceleration characterization telematics system, and characterizing an acceleration event in the received acceleration information using the received acceleration information, the short interval filter information, the long interval filter information, and the acceleration characterization telematics system.

In yet another additional embodiment of the invention, characterizing acceleration events includes applying at least one threshold value to the short interval filter information using the acceleration characterization telematics system.

In still another additional embodiment of the invention, the received acceleration information includes a time interval and at least one threshold value is determined using the time interval.

In yet still another additional embodiment of the invention, at least one threshold value is pre-determined.

In yet another embodiment of the invention, characterizing acceleration events includes applying at least one threshold value to the long interval filter information using the acceleration characterization telematics system.

In still another embodiment of the invention, the received acceleration event is a signal including a first leading edge, a first trailing edge, and a first amplitude, the short interval filter information is a signal including a second leading edge, a second trailing edge, and a second amplitude, the long interval filter information is a signal including a third leading edge, a third trailing edge, and a third amplitude, and characterizing an acceleration event in the received acceleration information further includes using the first leading edge, the second leading edge, the third leading edge, the first trailing edge, the second trailing edge, the third trailing edge, the first amplitude, the second amplitude, the third amplitude, and the acceleration characterization telematics system.

In yet still another embodiment of the invention, characterizing acceleration events includes determining a first cross point using the first leading edge, the second leading edge, the third leading edge, and the acceleration characterization telematics system, determining a second cross point using the first trailing edge, the second trailing edge, the third trailing edge, and the acceleration characterization telematics system, and characterizing an acceleration event using the first cross point, the second cross point, and the acceleration characterization telematics system.

In yet another additional embodiment of the invention, characterizing acceleration events includes determining a time interval using the first cross point, the second cross point, and the acceleration characterization telematics system.

In still another additional embodiment of the invention, the acceleration sensor is selected from the group consisting of a 3-axis accelerometer and a global positioning receiver.

In yet still another additional embodiment of the invention, the received acceleration information includes a plurality of acceleration samples and characterizing acceleration events further includes determining short interval filter information using the received acceleration information, a short moving average filter, and the acceleration characterization telematics system, where the short moving average filter utilizes a first number of acceleration samples and determining long interval filter information using the received acceleration information, a long moving average filter, and the acceleration characterization telematics system, where the long moving average filter utilizes a second number of acceleration samples, where the second number of acceleration samples is greater than the first number of acceleration samples.

DETAILED DESCRIPTION

Turning now to the drawings, systems and methods for efficient characterization of acceleration events in accordance with embodiments of the invention are illustrated. Information concerning vehicle speed and acceleration can provide insights into driver behavior. For example, such information can indicate a variety of driver behaviors, including, but not limited to, performing hard cornering or suddenly stopping while driving. In accordance with many embodiments of the invention, vehicle speed may be calculated using information provided by a Global Position System (GPS) receiver. A GPS receiver can determine velocity information in a variety of ways in accordance with embodiments of the invention, including, but not limited to, measuring the Doppler shift of the received signals and computing velocity information using location information determined using the GPS receiver. The differences in vehicle speed between measurements taken by the GPS receiver may be used to determine acceleration information for the vehicle. In a number of embodiments, a GPS receiver captures location information and/or speed information at a sampling rate. The sampling rate of a GPS receiver may be any of a variety of sampling rates, such as 0.25 seconds, 0.5 seconds, 1 second, or any other unit of time.

Acceleration information for a vehicle can also be captured using an accelerometer or other device configured to determine acceleration information. Accelerometers are often installed on a vehicle or mobile device. Accurate accelerometer data aligned with the axes of the vehicle is beneficial in many applications, including, but not limited to, telematics. Telematics is the integrated use of telecommunications and informatics, including, but not limited to, monitoring vehicle movement and behavior. Systems and methods for aligning a 3-axis accelerometer to a vehicle in accordance with embodiments of the invention are disclosed in U.S. patent application Ser. No. 13/622,844 to Hergesheimer et al., titled "Systems and Methods for 3-Axis Accelerometer Calibration" and filed Sep. 19, 2012, the entirety of which is hereby incorporated by reference.

Acceleration information received from an accelerometer, GPS receiver, or other acceleration measurement device contains the desired acceleration information along with other noise. This noise includes, but is not limited to, noise from the device itself and vibrations from the vehicle in which the device is mounted. In order to accurately characterize an acceleration event, acceleration information is extracted from the noisy measured signal. In many embodiments, the acceleration information is a signal including a leading edge, a trailing edge, and an amplitude that are utilized to characterize the acceleration information. In a variety of embodiments, the received acceleration information is a plurality of signals. In several embodiments, the received acceleration information corresponds to the horizontal, lateral, and/or vertical vectors of the vehicle in which the acceleration measurement device is installed. Acceleration characterizing telematics systems in accordance with embodiments of the invention filter received acceleration information while preserving the leading edge, trailing edge, and amplitude of the acceleration information. In a variety of embodiments, acceleration characterizing telematics systems are configured to efficiently characterize the filtered acceleration information to determine acceleration events. In many embodiments, acceleration characterizing telematics systems perform multiple levels of signal averaging in order to filter received acceleration information. In a number of embodiments, acceleration characterizing telematics systems utilize the multiple levels of signal averaging to properly establish the timing of the leading edge and/or the trailing edge of the received acceleration information. In several embodiments, acceleration characterizing telematics systems apply threshold values to the filtered acceleration information to efficiently process the filtered acceleration information. In a variety of embodiments, the received acceleration information is correlated with a variety of information including, but not limited to, location information, speed information, and any other information utilized according to the requirements of particular embodiments of the invention. In a number of embodiments, an acceleration measurement device captures acceleration information a sampling rate. The sampling rate of an acceleration measurement device may be any of a variety of sampling rates, such as 0.25 seconds, 0.5 seconds, 1 second, or any other unit of time.

Systems and methods for efficient characterization of acceleration events and acceleration characterization telematics systems in accordance with embodiments of the invention are discussed further below.

Acceleration Characterization Telematics System Overview

Figure 1:
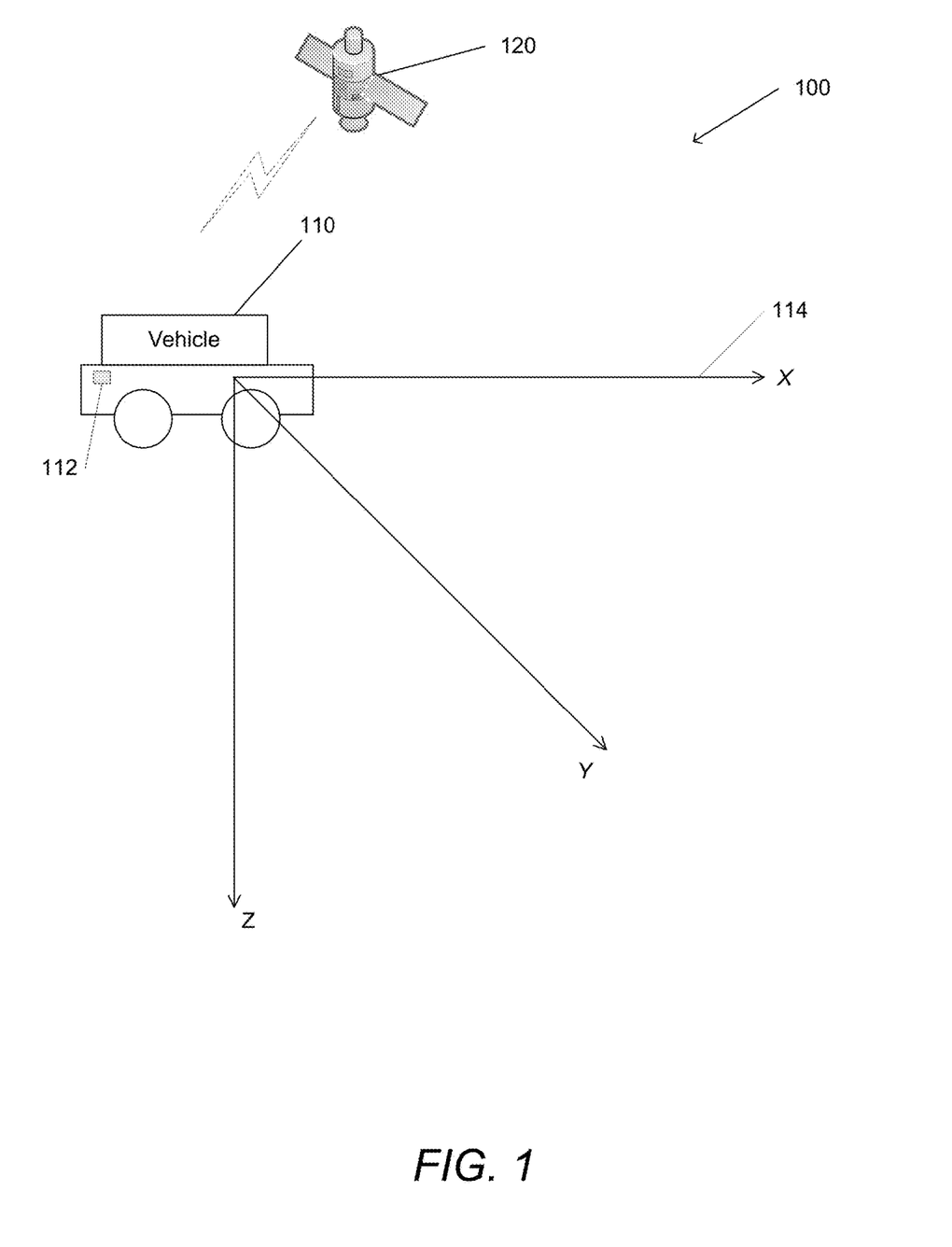
FIG. 1 conceptually illustrates a vehicle including a telematics system in accordance with an embodiment of the invention.

In many embodiments, acceleration characterization telematics systems are installed in vehicles. The acceleration characterization telematics system is configured to measure the acceleration of the vehicle and perform efficient characterization of the measured acceleration information. A conceptual illustration of an acceleration characterization telematics system in accordance with an embodiment of the invention is shown in FIG. 1. The system 100 includes a vehicle 110 with an installed acceleration characterization telematics system 112. In a variety of embodiments, the acceleration characterization telematics system 112 includes a GPS receiver configured to receive GPS signals from one or more GPS satellites 120. In many embodiments, the acceleration characterization telematics system 112 is configured to determine acceleration information using the received GPS signals. In a number of embodiments, the acceleration characterization telematics system 112 is configured to filter determined acceleration information. In several embodiments, the acceleration characterization telematics system 112 is configured to utilize a single filter to the determined acceleration information to filter noise from the determined acceleration information. In many embodiments, the acceleration characterization telematics system 112 applies two or more filters to filter noise from the determined acceleration information. Filters that are utilized in accordance with embodiments of the invention include, but are not limited to, short interval filters, long interval filters, simple moving filters, weighted least squares filters, finite impulse response filters, Chebyshev filters, Bessel filters, infinite impulse response filters, linear filters, and non-linear filters. Other filters not specifically listed can be utilized according to the requirements of a variety of embodiments of the invention.

In many embodiments the acceleration characterization telematics system 112 includes a 3-axis accelerometer configured to determine acceleration along the forward (x), lateral (y), and gravity (z) axes 114 of the vehicle 110. In several embodiments, the 3-axis accelerometer is aligned to the axes of the vehicle. In a variety of embodiments, the 3-axis accelerometer is not aligned to the axes of the vehicle. Systems and methods for aligning the accelerometer to the axes of the vehicle to improve the acceleration information received from the 3-axis accelerometer are disclosed in U.S. patent application Ser. No. 13/622,844, incorporated by reference above. In a number of embodiments, the acceleration characterization telematics system 112 is configured to filter noise present in the acceleration information determined using the 3-axis accelerometer. In several embodiments, the desired acceleration information is along the forward axis 114 of the vehicle 110. In many embodiments, noise present in the determined acceleration information is along the lateral and/or gravity axes 114 of the vehicle 110. It should be noted that the desired acceleration information and/or noise in the determined acceleration information may be present in any of the axes 114 in accordance with the requirements of particular embodiments of the invention.

Although a specific acceleration characterization telematics system is described above with respect to FIG. 1, a variety of acceleration characterization telematics systems may be utilized in accordance with embodiments of the invention. Systems and methods for efficient characterization of acceleration events using acceleration characterization telematics systems are discussed below.

Acceleration Characterization Telematics System Architecture

Figure 2:
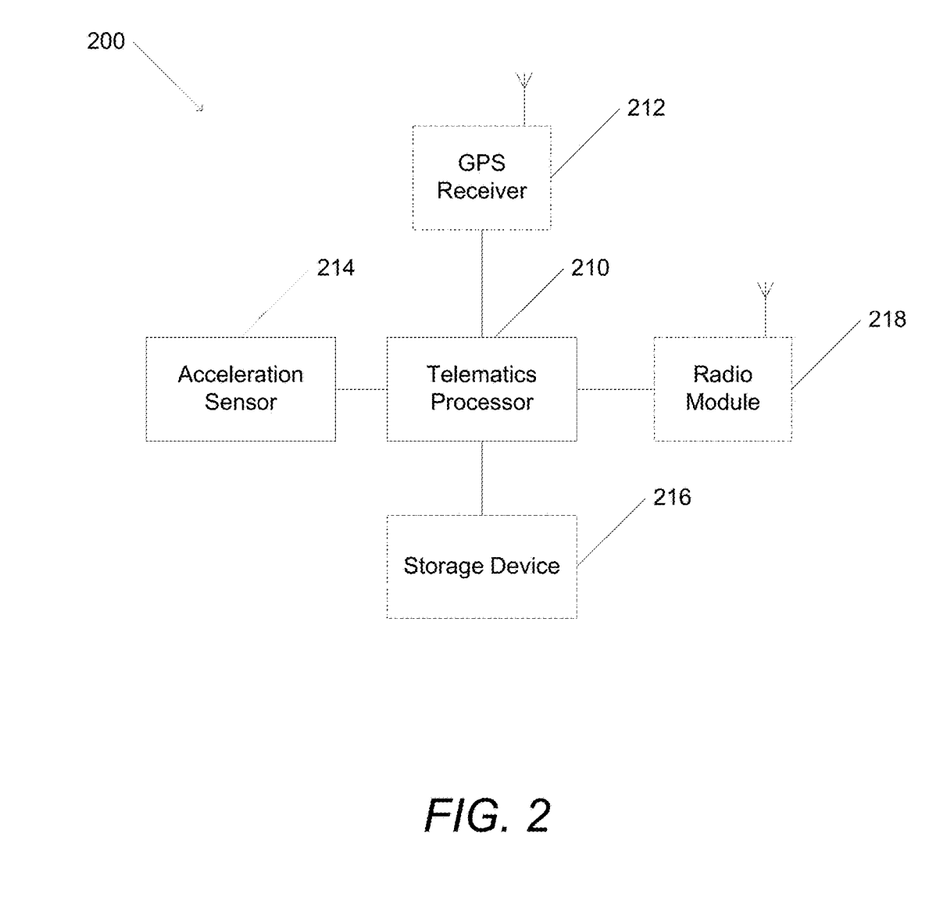
FIG. 2 conceptually illustrates a telematics system configured to perform efficient characterization of acceleration events in accordance with an embodiment of the invention.

Acceleration characterization telematics systems are utilized in vehicles to characterize behavior of the vehicle. Acceleration characterization telematics systems are configured to filter determined acceleration information used in the characterization of the behavior of the vehicle. An acceleration characterization telematics system in accordance with an embodiment of the invention is illustrated in FIG. 2. The acceleration characterization telematics system 200 includes a telematics processor 210. The telematics processor 210 is connected to an acceleration sensor 214 configured to detect acceleration information. In many embodiments, the acceleration sensor 214 is a 3-axis accelerometer. In a number of embodiments, the telematics processor 210 is connected to a GPS receiver 212. In several embodiments, the GPS receiver 212 and the acceleration sensor 214 are implemented using the same device. In a variety of embodiments, the telematics processor 210 is configured to determine location information using the GPS receiver 212.

The telematics processor 210 is configured to receive acceleration information using the acceleration sensor 214 and to efficiently characterize acceleration events using the received acceleration information. In many embodiments, the telematics processor 210 is configured to filter the received acceleration information. The telematics processor 210 can apply one or more filters to the received acceleration information. In a number of embodiments, the telematics processor 210 applies a short interval filter to the received acceleration information. In several embodiments, the telematics processor 210 applies a long interval filter to the received acceleration information. In a variety of embodiments, the telematics processor 210 analyzes the filtered acceleration information and/or the received acceleration information to characterize acceleration events present in the received acceleration information. In many embodiments, the telematics processor 210 is configured to characterize acceleration events using the amplitude, leading edge, and/or trailing edge of the filtered acceleration information and/or the received acceleration information. In several embodiments, the telematics processor 210 is configured to determine one or more cross points of the filtered acceleration information and/or received acceleration information;

in many embodiments the telematics processor 210 is configured to characterize acceleration events using the cross points.

In a number of embodiments, the telematics processor 210 is connected to a storage device 216. The storage device 216 is configured to store a variety of information in accordance with many embodiments of the invention, including, but not limited to, an acceleration event characterization application, received acceleration information, filtered acceleration information, and characterized acceleration event information. In a variety of embodiments, the telematics processor 210 is connected to a radio module 218. In many embodiments, the telematics processor 210 is configured to receive data using the radio module 218. In several embodiments, the telematics processor is configured to transmit data using the radio module 218. Any data may be transmitted using the radio module 218 according to the requirements of an embodiment of the invention including, but not limited to, an acceleration characterization application, received acceleration information, filtered acceleration information, and/or characterized acceleration event information.

A specific acceleration characterization telematics system is described above with respect to FIG. 2; however, a variety of acceleration characterization telematics systems may be utilized in accordance with embodiments of the invention. Processes for efficiently characterizing acceleration events in accordance with embodiments of the invention are discussed below.

Efficient Characterization of Acceleration Events

Figure 3:
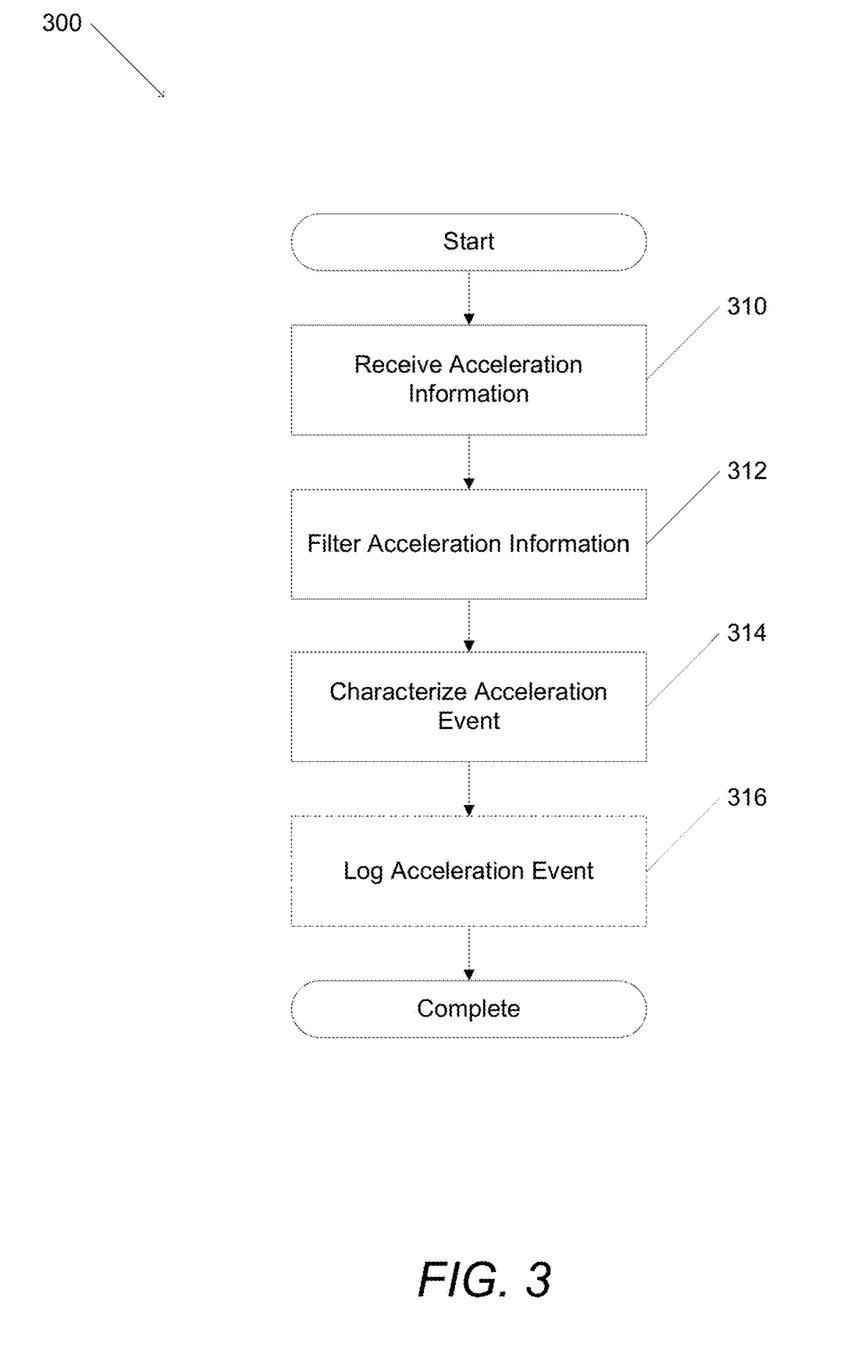
FIG. 3 is a flow chart illustrating a process for performing efficient characterization of acceleration events in accordance with an embodiment of the invention.

Acceleration characterization telematics systems are configured to efficiently characterize acceleration events present in received acceleration information. Acceleration characterization telematics systems utilize the characterized acceleration events to detect vehicle behaviors. These detected vehicle behaviors provide valuable insights into vehicle and driver behavior. A process for efficiently characterizing acceleration vents in accordance with an embodiment of the invention is illustrated in FIG. 3. The process 300 includes receiving (310) acceleration information. The acceleration information is filtered (312). Acceleration events are characterized (314). In many embodiments, acceleration events are logged (316).

In many embodiments, the acceleration information is received (310) using a 3-axis accelerometer. In a number of embodiments, the acceleration information is received (310) using a GPS receiver. In several embodiments, filtering (312) acceleration information includes applying a plurality of filters to the received (310) acceleration information. Processes that can be utilized to filter (312) acceleration information in accordance with a number of embodiments of the invention are discussed below with respect to FIG. 4. In a number of embodiments, characterizing (314) acceleration events includes analyzing the leading edge of the filtered acceleration information and/or received acceleration information. In many embodiments, characterizing (314) acceleration events includes analyzing the amplitude of the filtered acceleration information and/or the received acceleration information. In a variety of embodiments, characterizing (314) acceleration events includes analyzing the trailing edge of the filtered acceleration information and/or received acceleration information. In many embodiments, characterizing (314) acceleration events includes analyzing a plurality of filtered acceleration information and/or received acceleration information. In a number of embodiments, the filtered acceleration and/or the received acceleration information corresponds to acceleration in the horizontal, lateral, and/or vertical vectors of a vehicle. In several embodiments, logging (316) acceleration events includes storing the characterized (314) acceleration event using a storage device. In a variety of embodiments, logging (316) the characterized (314) acceleration event includes transmitting the acceleration event to a remote server system.

Although a specific process for the efficient characterization of acceleration events is described above with respect to FIG. 3, any of a variety of processes may be performed in accordance with embodiments of the invention. Processes for filtering acceleration information in accordance with embodiments of the invention are disclosed below.

Filtering Acceleration Information

Figure 4:
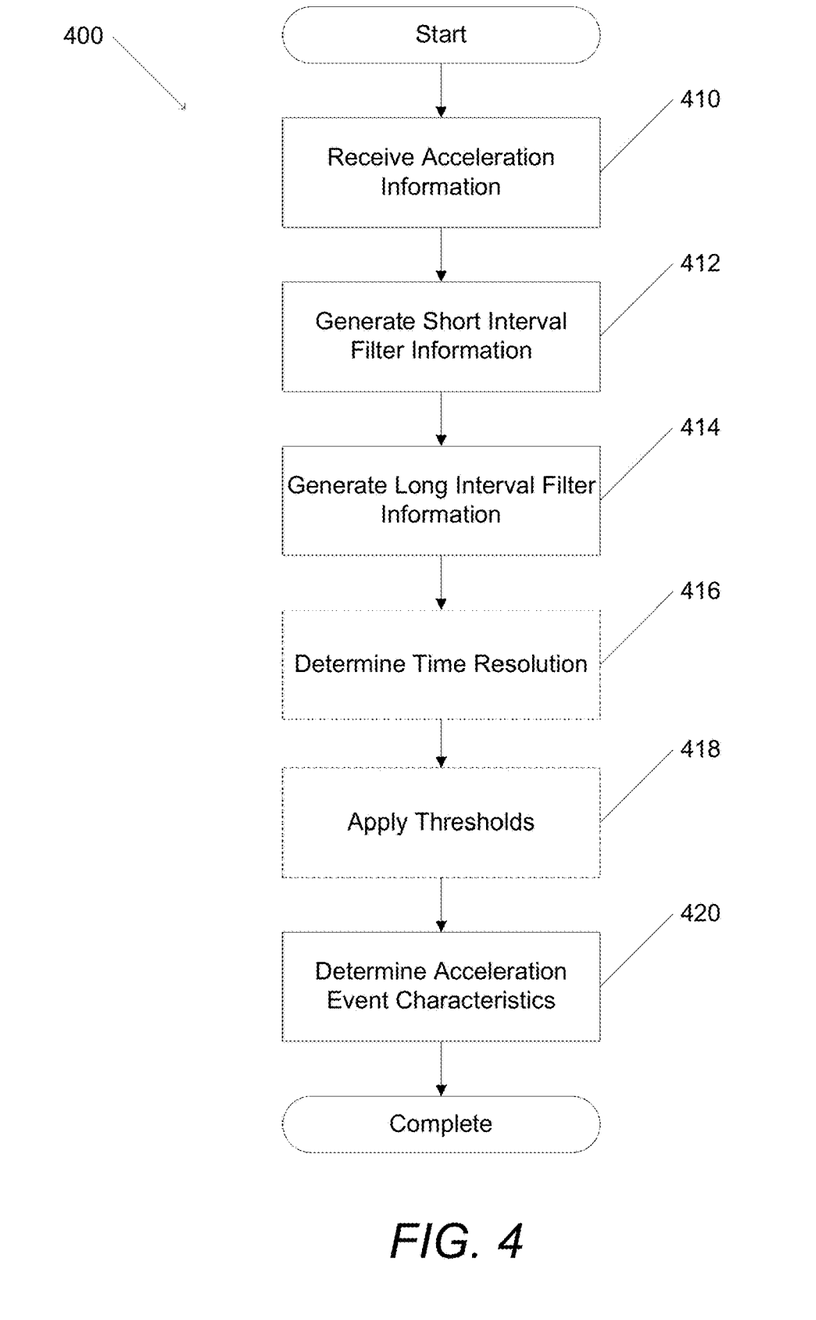
FIG. 4 is a flow chart illustrating a process for filtering acceleration events in accordance with an embodiment of the invention.

Filtering acceleration information removes noise in the acceleration information, enabling a more accurate characterization of acceleration events described by the acceleration information. A process for filtering acceleration information in accordance with an embodiment of the invention is illustrated in FIG. 4. The process 400 includes receiving (410) acceleration information. Short interval filter information is generated (412). Long interval filter information is generated (414). In many embodiments, a time resolution is determined (416). In several embodiments, thresholds are applied (418) and acceleration event characteristics are determined (420).

In many embodiments, acceleration is received (410) as described above with respect to FIG. 3. In several embodiments, the generated (414) short interval filter information is a moving average of the received (410) acceleration information. In many embodiments, the moving average is a number of samples taken from a 3-axis accelerometer; many embodiments of the invention utilize 4 samples, although any number of samples and any of a variety of filters can be utilized in accordance with the requirements of a specific embodiment of the invention. In several embodiments, the generated (416) long interval filter information is a moving average of the received (410) acceleration information. In many embodiments, the moving average is a number of samples taken from a 3-axis accelerometer; many embodiments of the invention utilize 8 samples, although any number of samples and any of a variety of filters can be utilized in accordance with the requirements of a specific embodiment of the invention.

In a number of embodiments, the time resolution determined (416) is related to the acceleration event being characterized. In several embodiments, the time resolution is determined (416) based on the received (410) acceleration information. In a variety of embodiments, the time resolution is determined (416) using the generated (412) short interval filter information and/or generated (414) long interval filter information. In many embodiments, thresholds are applied (418) to one or more of the received (410) acceleration information, the generated (412) short interval filter information, and the generated (414) long interval filter information. In a number of embodiments, the threshold value depends on the event being characterized. The threshold value may be pre-determined or determined dynamically based on the requirements of a particular embodiment of the invention. In several embodiments, the threshold value applied (418) is related to the determined (416) time resolution. In many embodiments, multiple threshold values are applied (418). In a variety of embodiments, determining (420) acceleration event characteristics are performed using processes similar to those described above with respect to FIG. 3. In several embodiments, determining (420) acceleration event characteristics includes determining the cross point of the short interval filter information, the long interval filter information, and/or the received acceleration information. In several embodiments, determining the cross point of the short interval filter information and the long interval filter information utilizes the received acceleration information. In a variety of embodiments, determining the cross point of the short interval filter information and the long interval filter information does not utilize the received acceleration information.

Figure 5:
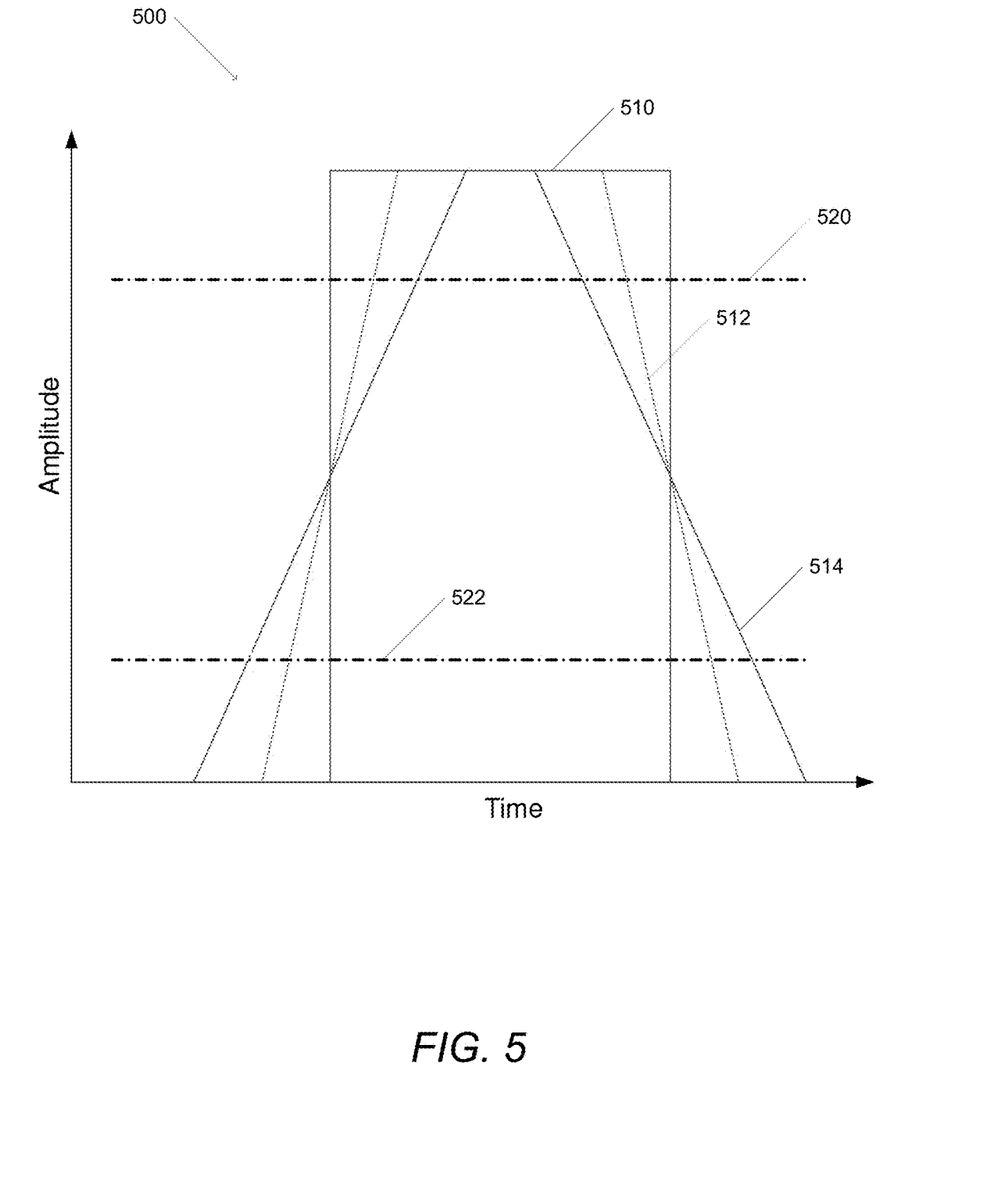
FIG. 5 is a diagram conceptually illustrating filtered acceleration events in accordance with an embodiment of the invention.

Turning now to FIG. 5, received acceleration information along with filtered acceleration information that can be utilized to characterize acceleration information in accordance with an embodiment of the invention is conceptually illustrated. The characterization of acceleration events 500 includes received acceleration information 510, short interval filter information 512, and long filter interval information 514. In the embodiment illustrated in FIG. 5, the short interval filter information 512 and/or the long filter interval information 514 is determined over a time period using a moving average window having a window center point. In the embodiment illustrated in FIG. 5, the time period for the moving average window of the long filter interval information 514 is greater than the time period for the moving average window of the short filter interval information 512. In the embodiment illustrated in FIG. 5, these moving average windows have the same center point and/or the time period of the moving average window for the long filter interval information begins before and ends after the time period of the moving average windows for the short filter interval information such that the time period for the long filter interval information contains the time period for the short filter interval information. The acceleration information is represented as amplitude over time. The characterization of acceleration events 500 further includes a first threshold value 520 and a second threshold value 522. The threshold values can be applied independently to the short interval filter information 512, the long interval filter information 514, and/or the received acceleration information 510. By applying different threshold values, the cross point(s) of the received acceleration information 510, short interval filter information 512, and/or long filter interval information 514 can be adjusted in the characterization of acceleration events.

Specific processes for filtering acceleration information in accordance with embodiments of the invention is described above with respect to FIG. 4 and a specific example of filtered acceleration information is conceptually illustrated above with respect to FIG. 5; however, a variety of filtering techniques, including those which use more than two filters or just a single filter and those which utilize filters other than short interval filters and long interval filters, may be utilized in accordance with embodiments of the invention.

Although the present invention has been described in certain specific aspects, many additional modifications and variations would be apparent to those skilled in the art. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:
1. An acceleration characterization telematics system, comprising:
    an acceleration sensor;
    a storage device, where the storage device stores an acceleration event characterization application; and
    a processor;
    wherein the acceleration event characterization application directs the processor to:
        receive acceleration information by using the acceleration sensor wherein the received acceleration information comprises a signal comprising a first leading edge, a first trailing edge, and a first amplitude;
        sample the acceleration sensor for acceleration information over a first time period by using a first moving average window having a window center point to generate short interval accelerometer filter information, wherein the short interval accelerometer filter information comprises a signal comprising a second leading edge, a second trailing edge, and a second amplitude;
        sample the acceleration sensor for acceleration information over a second time period by using a second moving average window having the same window center point as the first moving average window to generate long interval accelerometer filter information, the second time period being longer than the first time period and that contains the first time period wherein the long interval accelerometer information comprises a signal comprising a third leading edge, a third trailing edge, and a third amplitude; and
        characterize an acceleration event in the received acceleration information by calculating the intersection of the leading and trailing edges of the short interval accelerometer filter information and the leading and trailing edges of the long interval accelerometer filter information to identify the beginning and ending of the acceleration event in the received acceleration information.

2. The acceleration characterization telematics system of claim 1, wherein the acceleration event characterization application further directs the processor to apply at least one threshold value to the short interval filter information.

3. The acceleration characterization telematics system of claim 2, wherein:
    the received acceleration information comprises a time interval; and
    at least one threshold value is determined by using the time interval.

4. The acceleration characterization telematics system of claim 2, wherein at least one threshold value is pre-determined.

5. The acceleration characterization telematics system of claim 1, wherein the acceleration event characterization application further directs the processor to apply at least one threshold value to the long interval filter information.

6. The acceleration characterization telematics system of claim 1, wherein the acceleration event characterization application further directs the processor to:
    determine a first cross point by using the first leading edge, the second leading edge, and the third leading edge;
    determine a second cross point by using the first trailing edge, the second trailing edge, and the third trailing edge; and
    characterize an acceleration event by using the first cross point and the second cross point.

7. The acceleration characterization telematics system of claim 6, wherein the acceleration event characterization application further directs the processor to determine a time interval by using the first cross point and the second cross point.

8. The acceleration characterization telematics system of claim 1, wherein the acceleration sensor is selected from the group consisting of a 3-axis accelerometer and a global positioning receiver.

9. The acceleration characterization telematics system of claim 1, wherein:
the received acceleration information comprises a plurality of acceleration samples; and
the acceleration event characterization application further directs the processor to:
determine short interval filter information by using the received acceleration information and a short moving average filter, where the short moving average filter utilizes a first number of acceleration samples; and
determine long interval filter information by using the received acceleration information and a long moving average filter, where the long moving average filter utilizes a second number of acceleration samples, where the second number of acceleration samples is greater than the first number of acceleration samples.

10. A method for characterizing acceleration events, the method comprising:
receiving acceleration information wherein the received acceleration information comprises a signal comprising a first leading edge, a first trailing edge, and a first amplitude by using an acceleration characterization telematics system, the acceleration characterization telematics system comprising a processor, a memory connected to the processor, and an accelerometer;
sampling the acceleration sensor for acceleration information over a first time period by using a first moving average window having a window center point to generate short interval accelerometer filter information that includes a signal comprising a second leading edge, a second trailing edge, and a second amplitude based on the received acceleration information;
sampling the acceleration sensor for acceleration information by using a second moving average window having the same window center point as the first moving average window over a second time period to generate long interval accelerometer filter information that includes a signal comprising a third leading edge, a third trailing edge, and a third amplitude based on the received acceleration information, wherein the second time period is longer than the first time period and contains the first time period; and
characterizing an acceleration event in the received acceleration information by calculating the intersection of the leading and trailing edges of the short interval accelerometer filter information and the leading and trailing edges of the long interval accelerometer filter information to identify the beginning and ending of the acceleration event in the received acceleration information.

11. The method of claim 10, further comprising applying at least one threshold value to the short interval filter information by using the acceleration characterization telematics system.

12. The method of claim 11, wherein:
the received acceleration information comprises a time interval; and
at least one threshold value is determined by using the time interval.

13. The method of claim 11, wherein at least one threshold value is pre-determined.

14. The method of claim 10, further comprising applying at least one threshold value to the long interval filter information by using the acceleration characterization telematics system.

15. The method of claim 10, further comprising:
determining a first cross point by using the first leading edge, the second leading edge, the third leading edge, and the acceleration characterization telematics system;
determining a second cross point by using the first trailing edge, the second trailing edge, the third trailing edge, and the acceleration characterization telematics system; and
characterizing an acceleration event by using the first cross point, the second cross point, and the acceleration characterization telematics system.

16. The method of claim 15, further comprising determining a time interval by using the first cross point, the second cross point, and the acceleration characterization telematics system.

17. The method of claim 10, wherein the acceleration sensor is selected from the group consisting of a 3-axis accelerometer and a global positioning receiver.

18. The method of claim 10, wherein the received acceleration information comprises a plurality of acceleration samples and the characterizing acceleration events further comprises:
determining short interval filter information by using the received acceleration information, a short moving average filter, and the acceleration characterization telematics system, where the short moving average filter utilizes a first number of acceleration samples; and
determining long interval filter information by using the received acceleration information, a long moving average filter, and the acceleration characterization telematics system, where the long moving average filter utilizes a second number of acceleration samples, where the second number of acceleration samples is greater than the first number of acceleration samples.

* * * * *